(12) United States Patent
Walger, Jr.

(10) Patent No.: US 6,484,432 B1
(45) Date of Patent: Nov. 26, 2002

(54) FLOUNDER GIG

(76) Inventor: Fred L. Walger, Jr., 1309 Mulcahy St., Rosenberg, TX (US) 77471

( * ) Notice: Subject to any disclaimer, the term of this patent is extended or adjusted under 35 U.S.C. 154(b) by 0 days.

(21) Appl. No.: 09/660,161

(22) Filed: Sep. 12, 2000

(51) Int. Cl.$^7$ ............................................. A01K 81/04
(52) U.S. Cl. ................................................................. 43/6
(58) Field of Search ........................................ 43/6, 18.1

(56) References Cited

U.S. PATENT DOCUMENTS

| | | | |
|---|---|---|---|
| 2,951,306 A | * | 9/1960 | Woodfield |
| 3,216,141 A | * | 11/1965 | Walger |
| 4,027,418 A | * | 6/1977 | Baldi et al. ................... 43/6 |
| 4,183,163 A | * | 1/1980 | Reimer ........................ 43/24 |
| 4,272,905 A | * | 6/1981 | Hinkle ......................... 43/6 |
| 4,335,678 A | * | 6/1982 | Garza et al. ................. 119/1 |
| 5,950,346 A | * | 9/1999 | da Rosa ..................... 43/21.2 |
| 6,148,558 A | * | 11/2000 | Ono et al. .................. 43/18.1 |

* cited by examiner

Primary Examiner—Charles T. Jordan
Assistant Examiner—Kimberly S. Smith
(74) Attorney, Agent, or Firm—Bill B. Berryhill

(57) ABSTRACT

An improved flounder gig comprising, in combination, a handle, a spear carried at one end of the handle having a pair of outwardly biased legs at the distal ends of which are diverging sharp prongs, and an elongated guide plate having a pair of spaced apart apertures slidably receiving said legs. The guide plate is moveable from a retracted position nearer the lower end of the handle in which the legs and prongs are allowed to assume an outwardly diverging relationship under the influence of the biased legs and a terminal position nearer the prongs in which the prongs are maintained in a closer relationship.

1 Claim, 1 Drawing Sheet

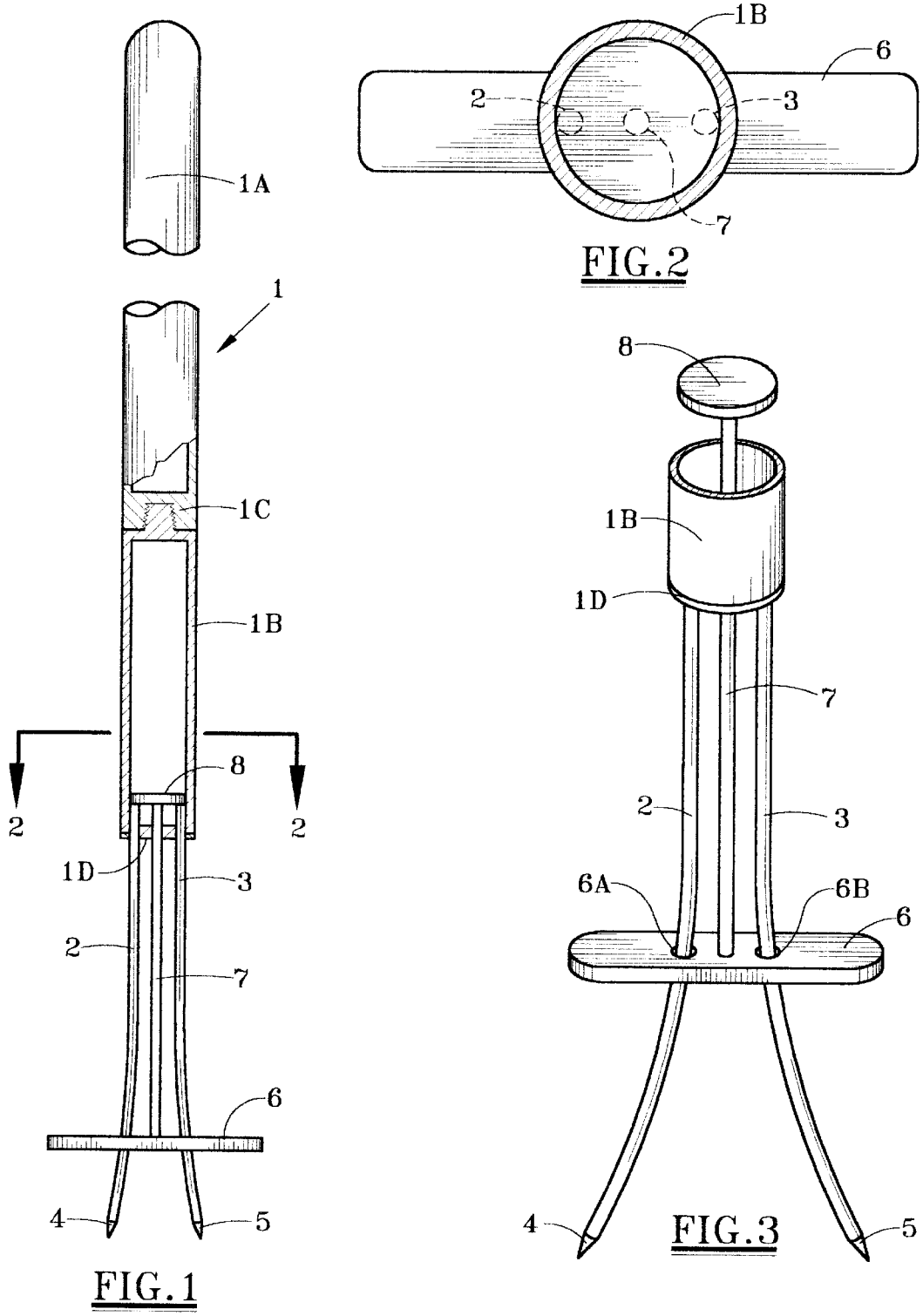

FLOUNDER GIG

BACKGROUND OF THE INVENTION

1. Field of the Invention

The present invention pertains to fishing apparatus. More specifically, it pertains to a fish gig for spearing flounder.

2. Description of the Prior Art

The flounder is a flat fish which is found in shallow sea water. The flounder typically buries itself in the sandy sea floor, sometimes only with its eyes uncovered. While founders are occasionally caught on fish hooks, they are more commonly caught by locating them buried in the sand and spearing them with some type of spear or gig. While many types of flounder gigs have been developed, a number of them are now illegal because they include barbs prohibited by law. Furthermore, even if such gigs are used, they tear the flesh of the fish when the gig is withdrawn or released. Other types of spears or gigs do not securely hold flounder thereupon as they are being removed from the water.

U.S. Pat. No. 3,216,141 discloses a flounder gig which has been well accepted over the past few years. This type of gig provides a spear having a pair of barbless prongs which are biased apart from each other but are drawn together, prior to use, so that the prongs are close to each other as the flounder is impaled thereon. An actuator plate having a pair of longitudinally spaced apart apertures is slidably carried on the spear. For initial use, the actuator plate is pushed toward the prongs drawing them together and placing them in a parallel position for initial use. When the fish is impaled by the prongs, the plate is engaged and pushed upwardly allowing the prongs to move apart from each other. Since the prongs are biased apart from each other, they have a tendency to spread apart. The resulting opposing forces tend to retain the flounder on the spear as the fish is removed from the water. Once the fish is removed, the actuator plate may be reset to its initial position for reuse.

In the flounder gig of U.S. Pat. No. 3,216,141, a flexible cable or chain is secured to a handle at one end thereof and to the actuator plate at the other. This limits the downward movement of the actuator plate to provide the proper initial setting and to prevent its accidental loss. However, such a chain or cable increases the cost of the gig and makes it somewhat more complex. In addition, the cable may rust and break necessitating its replacement. Furthermore, it may cause the gig to be accidentally engaged on various objects when used. Although the flounder gig of U.S. Pat. No. 3,216,141 is one of the best presently available, it does have some undesirable characteristics.

SUMMARY OF THE PRESENT INVENTION

The flounder gig of the present invention is similar to the one disclosed in U.S. Pat. No. 3,216,141. It is provided with a handle at one end of which is secured a spear comprising a pair of outwardly biased legs and prongs. It is, also provided with a guide plate slidably carried by the spear which, in a terminal position near the distal end of the prongs, maintains the legs in a substantially spaced apart, parallel relationship. The guide plate may be retracted toward the handle, releasing the legs so that the prongs on opposing distal ends thereof spring outwardly to provide opposing forces for holding an impaled flounder thereon. The gig is improved over the prior art by providing a limiting device on the guide plate to limit its movement to a lowermost terminal position. This limits the downward movement of the guide plate, eliminating the use of a cable for this purpose.

Furthermore, the handle of the gig is designed so that the gig will float in sea water. Thus, if accidently dropped in the water it may be retrieved rather than sinking.

The flounder gig of the present invention is simple in construction, assembly and operation. It can be manufactured at a low cost. Other objects and advantages of the invention will be apparent from reading the description which follows in conjunction with the accompanying drawings.

BRIEF DESCRIPTION OF THE DRAWINGS

FIG. 1 is a longitudinal view, partially in section, of the flounder gig of the present invention in which the spear and guide plate thereof are shown in a ready to use position;

FIG. 2 is a cross-sectional view of the flounder gig of the present invention, taken along line 2—2 of FIG. 1; and FIG. 3 is a partial pictorial view of the flounder gig of the present invention, showing the guide plate and limiting device thereof in a withdrawn position in which the legs and prongs of the spear are outwardly biased for holding a fish engaged thereby.

DESCRIPTION OF A PREFERRED EMBODIMENT

Referring now to the drawings, there is shown a flounder gig 1, the main components of which are a handle of several components 1A, 1B, 1C, 1D; a spear 2, 3, guide plate 6 and guide limiting means 7, 8. The handle is an elongated member and may be made of any suitable material. In the preferred embodiment, it is aluminum and in two parts, 1A and 1B, threaded together at 1C. Thus, it can be broken down for storage. The lower end of part 1B is closed by plate 1D. The parts 1A and 1B are preferably tubular so that the interior is a substantially air-tight chamber. Thus, the gig will float in sea water if accidently dropped therein.

The spear comprises a pair of legs 2, 3 connected to the lower end of the handle 1B. As best seen in FIGS. 1 and 2, the spear legs 2, 3 may be attached to the lower end of the handle by inserting through holes in the plate 1D, extending into the hollow lower end of the handle 1, and attached for fixed relationship therewith. It will be noted that the legs 2, 3 curve or diverge outwardly toward the distal ends thereof terminating in sharp prongs 4, 5.

The guide plate 6 includes a pair of spaced apart apertures 6A, 6B each of which is slidably engaged by a respective leg 2, 3 of the spear. The guide limiting means comprises a guide rod 7, the lower end of which is attached to the guide plate 6 and at the upper end of which is provided an enlarged circular or cylindrical guide head 8. The guide rod 7 is slidingly received in a central aperture of the closure plate 1D and may reciprocate therein between an extended terminal position, as shown in FIG. 1, and a retracted position as shown in FIG. 3, the extended terminal position being determined by engagement of the guide head 8 with the upper ends of the spear legs 2, 3 or any other stop surface which may be provided in the handle 1.

In use, the guide plate 6 is moved downwardly to the terminal position of FIG. 1, being stopped by the engagement of the guide head 8 with the stop surface within handle 1. In this position, the spear legs 2, 3 are held in a somewhat parallel relationship. The gig is then used to spear a flounder, the sharp prongs 4, 5 passing through the flounder. As the guide plate 6 comes in contact with the flounder it is forced upwardly toward the retracted position of FIG. 3, allowing the legs 2, 3 and prongs 4, 5 to spring outwardly holding the flounder on the gig until the flounder is removed. The flounder may be easily removed by pushing the guide plate 6 downwardly toward the terminal position of FIG. 2 so that the legs 2, 3 are again somewhat parallel. For reuse, the guide plate 6 is simply repositioned as shown in FIG. 1.

Thus, the flounder gig of the present invention includes some features of a well accepted flounder gig of the prior art. However, it also includes improvements, particularly in the guiding and limiting mechanism thereof, which make it a more desirable gig than those of the prior art. In addition, it is floatable in sea water so that even if it is accidently dropped in the water, it may be easily retrieved.

While a single embodiment of the invention has been described herein, many variations thereof can be made without departing from the spirit of the invention. Accordingly, it is intended that the scope of the invention be limited only by the claims which follow.

I claim:

1. An improved flounder fish gig comprising, in combination, an elongated handle, a spear carried at one end of said handle having a pair of outwardly biased legs at distal ends of which are diverging sharp prongs, and an elongated guide plate having a pair of spaced apart apertures slidingly receiving said legs and moveable from a retracted position nearer a lower end of said handle, in which said prongs are allowed to assume an outwardly diverging position under the influence of said biased legs, to a self-maintained terminal position nearer said prongs, in which said prongs extend below said guide plate and are maintained in a closer but spaced apart relationship, said guide plate being attached to a guide rod slidingly received in a central aperture provided at one end of said handle and extending into a hollow closed portion of said handle for attachment to an enlarged guide head, said guide rod being extendable from said central aperture with said guide plate, until movement is arrested, by engagement of said guide head with a stop surface, at said self-maintained terminal position, said guide plate being engageable by a fish when impaled by said spear prongs automatically forcing said guide plate toward said retracted position so that said prongs assume said outwardly diverging position to hold said fish on said spear without manual manipulation of said guide rod.

* * * * *